(12) United States Patent
Abboud et al.

(10) Patent No.: US 12,022,001 B1
(45) Date of Patent: Jun. 25, 2024

(54) METHOD AND APPARATUS FOR PROVIDING SECURE DEBUG INFORMATION

(71) Applicant: Palantir Technologies Inc., Denver, CO (US)

(72) Inventors: Tony Abboud, New York, NY (US); Spencer Lake, New York, NY (US); Bradley Moylan, Torrance, CA (US); Andrew Bradshaw, New York, NY (US); Maximilian Najork, Brooklyn, NY (US)

(73) Assignee: Palantir Technologies Inc., Denver, CO (US)

( * ) Notice: Subject to any disclaimer, the term of this patent is extended or adjusted under 35 U.S.C. 154(b) by 540 days.

(21) Appl. No.: 17/344,258

(22) Filed: Jun. 10, 2021

(51) Int. Cl.
| | | |
|---|---|---|
| *G06F 21/00* | (2013.01) | |
| *G06F 11/36* | (2006.01) | |
| *G06F 21/60* | (2013.01) | |
| *G06F 21/62* | (2013.01) | |
| *H04L 9/30* | (2006.01) | |
| *H04L 9/32* | (2006.01) | |

(52) U.S. Cl.
CPC .......... *H04L 9/3247* (2013.01); *G06F 11/366* (2013.01); *G06F 21/602* (2013.01); *G06F 21/6218* (2013.01); *H04L 9/3073* (2013.01)

(58) Field of Classification Search
None
See application file for complete search history.

(56) References Cited

U.S. PATENT DOCUMENTS

| | | | | |
|---|---|---|---|---|
| 9,633,185 | B2* | 4/2017 | Shin | G06F 21/602 |
| 10,254,337 | B2* | 4/2019 | Zhang | G06F 11/3656 |
| 11,468,199 | B2* | 10/2022 | Kataria | H04L 63/20 |
| 11,754,623 | B2* | 9/2023 | Kurts | G01R 31/31705 |
| | | | | 713/155 |
| 11,809,576 | B2* | 11/2023 | Tsirkin | G06F 21/6218 |
| 2013/0212425 | A1* | 8/2013 | Blaine | G06F 11/3648 |
| | | | | 714/6.1 |
| 2015/0242606 | A1* | 8/2015 | Shin | G06F 21/602 |
| | | | | 726/17 |
| 2017/0139008 | A1* | 5/2017 | Lim | G01R 31/3177 |
| 2020/0348361 | A1* | 11/2020 | Kurts | G06F 21/606 |
| 2021/0240839 | A1* | 8/2021 | Tsirkin | G06F 11/3476 |
| 2022/0027519 | A1* | 1/2022 | Kataria | G06F 21/71 |

* cited by examiner

*Primary Examiner* — Jeffery L Williams
(74) *Attorney, Agent, or Firm* — Faegre Drinker Biddle & Reath LLP

(57) ABSTRACT

A method and apparatus provides debug information and employs a central debug service in a management environment that issues, to a client debug agent in a client environment, a cryptographically secure signed request for access to debug information that is generated by code executing in the client environment. The request is signed using a private key of a public/private key pair associated with the central debug service. The central debug service receives from the client debug agent, a request that requests the public key of public/private key pair associated with the central debug service and provides the public key of the central debug service to the client debug agent, in response to the request, for verification of approval to access debug information in the client environment. The central debug service receives the requested debug information from the client debug agent, in response to a successful signature verification by the client debug agent.

20 Claims, 6 Drawing Sheets

METHOD AND APPARATUS FOR PROVIDING SECURE DEBUG INFORMATION

1. BACKGROUND

For a number of security and privacy reasons, product development teams may not always have access to client cloud computing environments that run applications and other processes that need to be monitored to debug when undesired circumstances occur. For example, development teams that attempt to gain access to the cloud computing environment or client computing environment of a client to pull debugging information may be prevented from accessing the debugging information for security or privacy reasons.

Typically, only certain individuals with access to the client secure environments are allowed to pull relevant product information for debugging. However, debugging information relating to application instances that are running in a client secure environment within an on-premise client computing environment or in a cloud computing platform needs to be accessed by developers or other individuals that do not typically have access to client secure environments in the platform. Debugging information such as diagnostic logs, profiling information and other information is often required to be evaluated by developers to assess how well processes are working. However, existing workflows requiring only limited individuals to access a client secure environment can be unworkable when many different developers, application instances to be debugged, and multiple client secure environments are present.

2. SUMMARY

Instead of having a third party (e.g., limited individuals under contractual obligations or with security clearance) perform manual debugging data retrieval operations on behalf of developers or other users, in some implementations, a centralized debug service architecture employs a central debug service for multiple secure client environments and also deploys a client debug agent in each secure client environment. In one example, the central debug service proxies (e.g., processes and/or forwards) requests from a separate service, a requesting agent (e.g., a web user interface) to client debug agents located in the client secure environments. Debug agents, also referred to herein as remote debug agents or client debug agents, are deployed remote environments and act as a proxy to fetch/provide debug information from within the respective remote secure environment, and sends the debug information to the central debug service, which makes the debug information available to the requesting agent (e.g., the web user interface).

In some implementations, an authorization model is employed wherein the client debug agents do not have initial trust with the central debug service and undergo a request and reply operation to ensure requests for debug information from the central debug service is coming from a trusted source and hence verified by each client debug agent before taking action in their respective environments. In certain implementations a push approach is used by the central debug service and respective client debug agents to provide debug information from secure client environments such that the requests are sent from the debug central service to the debug agent. In some implementations a pull approach is used by the central debug service and respective client debug agents to provide debug information from secure client environments such that requests are sent from the debug agent to the central service. In some implementations, when a debug agent receives a request, the debug agent reaches out to a known trusted entity to insure that the request came from the entity that made the request.

In certain implementations requests to the client debug agents are done synchronously and in real-time. The data that is returned may be historical data or real time data that is captured from a service (e.g., memory/CPU profile information). For example, in some implementations, a request for debug information is made in real time with the client debug agent responsive in real time to provide the debug data back. In some implementations debug information is provided if one or more predetermined conditions are satisfied.

According to some embodiments, a method for providing debug information includes issuing, by a central debug service in a management environment, to a client debug agent in a client environment, a cryptographically secure signed request for access to debug information that is generated by code executing in the client environment, the cryptographically secure signed request being signed using a private key of a public/private key pair associated with the central debug service, receiving, from the client debug agent, a reply that requests the public key of public/private key pair associated with the central debug service, providing the public key of the central debug service to the client debug agent, in response to the reply, for verification of approval to access debug information in the client environment, and receiving the requested debug information from the client debug agent, in response to a successful signature verification by the client debug agent, wherein the method is carried out by one or more processors. In some implementations the request from debug-central is signed by the private key of the central debug service and then is verified by the in-environment debug-agent by way of making an additional request back to the central debug service to retrieve the pubic key to verify the signature in the environment. In certain implementations, verification of the common name and issuer of the reply is performed.

In some examples, the method includes providing debug agent registration by mapping a plurality of client debug agent identifiers to corresponding environment identifiers, receiving a request for debug information, from a requesting agent, that comprises data representing a destination client debug agent, and wherein issuing the signed request for access to debug information comprises checking the mapping of the plurality of client debug agent identifiers for the data representing the destination client debug agent.

In certain examples, the method includes issuing the reply that requests the public key of public/private key pair associated with the central debug service, in response to receiving the cryptographically secure signed request for access to debug information, in response to obtaining the public key of the central debug service from the central debug service, verifying that the cryptographically secure signed request is from the central debug service, and providing the debug information to the central debug service in response to a successful verification.

In certain embodiments, a method for providing debug information includes receiving a cryptographically secure signed request for access to debug information, from a central debug service, the cryptographically secure signed request being signed using a private key of a public/private key pair associated with the central debug service, issuing a request in response to the cryptographically secure signed request for access to debug information, that requests the public key of public/private key pair associated with the central debug service, in response to obtaining the public key of the central debug service from the central debug service, verifying that the cryptographically secure signed request is from the central debug service, and providing the debug information to the central debug service in response to a successful verification.

In some examples, the method includes receiving event criteria information from the central debug service, and sending debug information back to the central debug service on an as needed event driven basis based on the event criteria information. In certain examples, the method includes polling for debug information tasks issued by the central debug service, and returning generated debug information to the central debug service in response to an issued debug information task.

In some embodiments, an apparatus includes one or more processors operative to execute stored instructions, and non-transitory memory, in operative communication with the one or more processors, comprising stored executable instructions that when executed by the one or more processors, causes the one or more processors to issue, by a central debug service in a management environment, to a client debug agent in a client environment, a cryptographically secure signed request for access to debug information that is generated by code executing in the client environment, the cryptographically secure signed request being signed using a private key of a public/private key pair associated with the central debug service, receive, from the client debug agent, a reply that requests the public key of public/private key pair associated with the central debug service, provide the public key of the central debug service to the client debug agent, in response to the reply, for verification of approval to access debug information in the client environment, and receive the requested debug information from the client debug agent, in response to a successful signature verification by the client debug agent.

In certain examples, the apparatus including a plurality of processors wherein at least one of the plurality of processors is configured to receive a cryptographically secure signed request for access to debug information, from a central debug service, the cryptographically secure signed request being signed using a private key of a public/private key pair associated with the central debug service, issue a request in response to the cryptographically secure signed request for access to debug information, that requests the public key of public/private key pair associated with the central debug service, in response to obtaining the public key of the central debug service from the central debug service, verifying that the cryptographically secure signed request is from the central debug service, and provide the debug information to the central debug service in response to a successful verification.

In some examples, wherein the at least one of the plurality of processors is further configured to receive event criteria information from the central debug service, and send debug information back to the central debug service on an as needed event driven basis based on the event criteria information.

Depending upon the embodiment, one or more benefits may be achieved. These benefits and various additional benefits can be fully appreciated with reference to the detailed description and accompanying drawings that follow.

3. BRIEF DESCRIPTION OF THE DRAWINGS

The implementations will be more readily understood in view of the following description when accompanied by the below figures, wherein like reference numerals represent like elements, and wherein.

4. DETAILED DESCRIPTION

Figure 1:
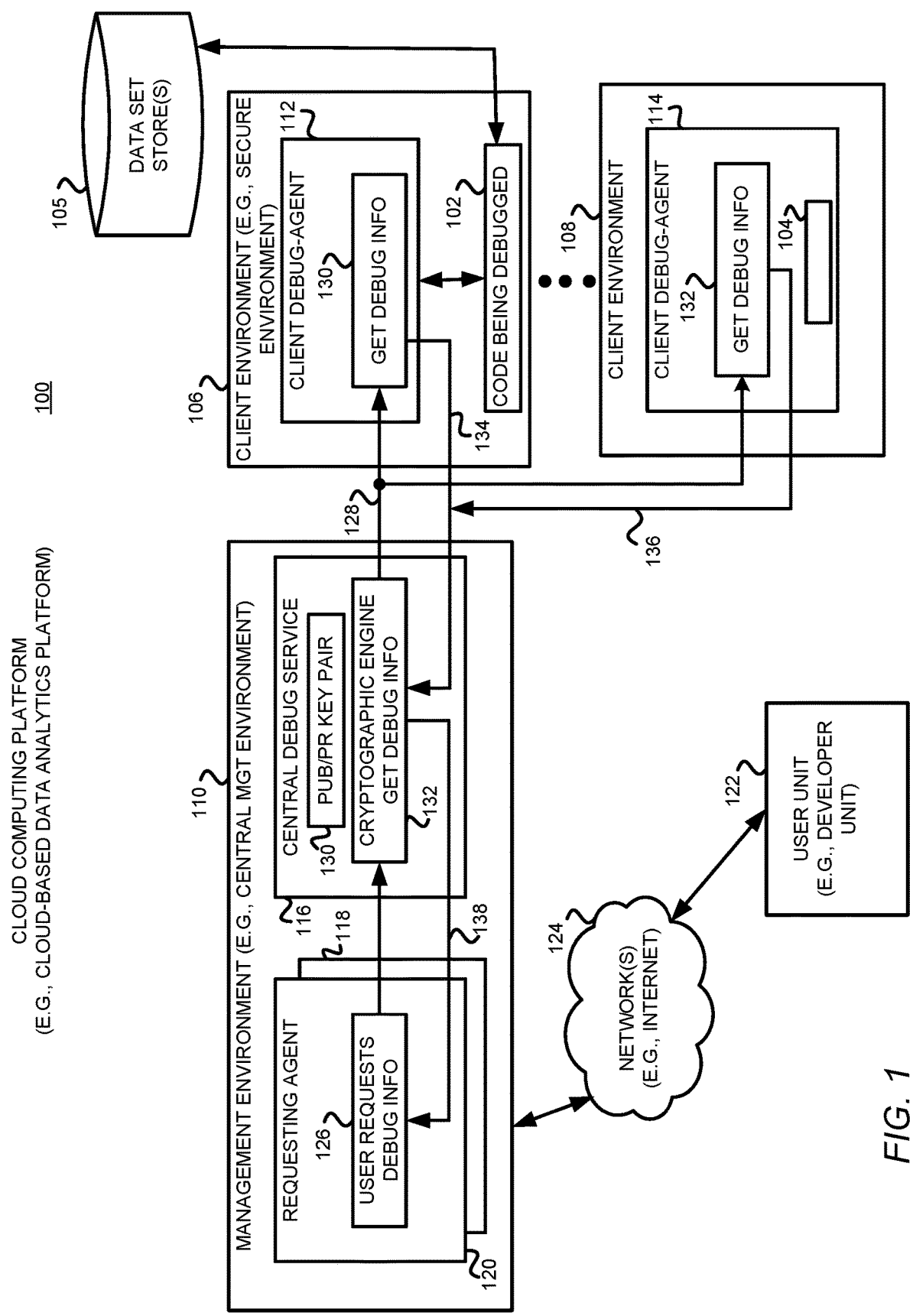
FIG. 1 is a block diagram illustrating one example of a computing system in accordance with one example set forth in the disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some embodiments, benefits include significant improvements, including for example, a more secure debug platform that provides a centralized control of debug operation across different client environments through a common central debug service. Debug data is selected for retrieval in real time and/or is pushed in real time based on conditions being met. In some implementations, the conditions are sent as part of a request for debug information or can be configured in the client debug agents a priori. Security is improved by providing cryptographic verification on a per request basis if desired, by differing client debug agents with a central debug service. The secure debug platform supports debugging workflows across heterogeneous environments, such as with cloud computing systems and non-cloud computing systems. Other technical improvements are also provided.

In certain embodiments, one or more solutions rooted in computer technology overcome one or more problems specifically arising in the realm of computer technology. Some embodiments are directed to computing platforms that include software debugging services across multiple client environments such as on-premise client computing environments or in a cloud computing platform that securely handle obtaining debugging information for software that facilitates interactive compute operations for data set generation. Some embodiments are directed to computing platforms including hosts and networking devices. In some examples, the computing platforms include virtual servers or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity.

FIG. 1 illustrates a network diagram depicting a network computing system implemented as a cloud based data processing platform 100 and consistent with some embodiments, the data processing platform 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the platform 100 are discussed in the singular sense, multiple instances of one or more of the various functional components may be employed.

The data processing platform 100 includes a group of servers which host network applications, application interfaces (APIs) and/or other code being debugged 102 and 104 respectively. The network applications hosted by the data processing platform 100 may collectively compose an application suite that provides users of the network system 100 with a set of related, although independent, functionalities that are accessible by a common interface. For example, the network applications may compose a suite of software application tools that can be used to analyze data to develop various insights about the data and generate data sets 105, and visualize various metrics associated with the data. To further this example, the network applications may be used to analyze data to develop particular metrics with respect to information included therein, while other network applications may be used to render graphical representations of such metrics.

In this example, each of the servers provide a separate client environment 106 and 108 that are secure client environments meaning that client environments are not accessible to each other and access to the client environments are protected via security policies that are managed by a central management environment 110 in the platform 100, by another service or by a customer running the platform on their premise infrastructure. However any suitable configuration may be employed and it will be recognized that the client environments in some implementations need not be secure environments.

The management environment 110 includes a central debug service 116 that communicates with the client debug agents 112 and 114 and receives configuration data and debug information requests 118 from a requesting agent 120. In some examples, requesting agent 120 is a web interface that is callable via a URL by a browser in a user unit 122 through a network 124 such as the internet or other suitable network. In some examples, the requesting agent define the notion of "standard" diagnostic information for debugging the services, which improves the workflow because developers do not need to reason about how to retrieve the debug information for each service (e.g. "which command do I need to run in order to fetch this") and instead can just press an interface button in the central debugging interface. In some examples, the user unit 122 is a laptop or other terminal used by a developer or other user that wishes to receive and select debug information from the client debug agents 112 and 114 for respective applications 102 and 104 that are being debugged. In some implementations, a client debug agent 112 and 114 is provided to each client environment 106 and 108 during a registration process. The management environment 110, requesting agent 120, central debug service 116, client environments, client debug agents in some implementations are implemented as code modules being executed in a server environment by on one or more processors that execute executable code that is stored in memory such as RAM, ROM or any other suitable memory.

As noted above, for security and privacy reasons, product development teams may not always have access to client environments to pull debugging information that they need to support their products. In prior systems, only certain individuals were considered trusted and had access to the environments and needed to pull relevant product information for debugging from the various client environments. Unlike such prior systems, the system described herein in some implementations provides the ability for secure cross-environment collection of metrics/diagnostics and a collection of metrics based on an observed state rather than continuously pushing debugging information at the central system. In certain implementations, active debugging is provided which gathers diagnostics from a live running process that is running in the client environment. As further described herein, users are able to perform various workflows from the central management environment and are performed through, for example, two services that provide retrieval of debugging information.

In some implementations, the central debug service 116 is deployed in the central management environment 110. The debug agents 112 and 114 in some examples are employed in every environment to act as a proxy to fetch debugging information from applications or other code that are being run within the respective client environment. In some examples, the central debug service 116 serves as a proxy for requests received from requesting agent 120 to multiple client agents 112 and 114 and as such, in some examples serves as a central debug service for multiple client environments and multiple client debug agents.

In operation, for example, a user requests debug information through, for example, a user interface provided by the requesting agent 120. For example, a user through user unit 122 can make a user request for debug information shown as 126 and the request 118 is sent to the central debug service 116. The central debug service 116 acts as a proxy and makes a subsequent cryptographically secure request 128 to the relevant client debug agent to fetch corresponding debug information, shown as get debug information 130 and 132 respectively. For example, the central debug service maintains a list of client debug agents and the request 118 includes a client environment identifier so that the central debug service 116 can properly route the request 128 to the appropriate client environment and hence client debug agent 112 or 114. The client debug agent performs the requested work and returns the results back to the central debug service shown as reply 134 and 136 respectively. The central debug service then returns the results shown as central debug service reply 138 back to the requesting agent 120. In one example, there is a requesting agent 120 associated with each client environment such as a separate URL for each client environment. In other examples, the agent 120 supports interfacing with multiple clients if desired. In some implementations, each of the client debug agents 112 and 114 also have distinct agent URIs. In some implementations authorization occurs between the user requesting the debug information and the central debug service that verifies that the user requesting the information is authorized to access it so that the user is actually authorized to execute the command and retrieve the information.

Figure 2:
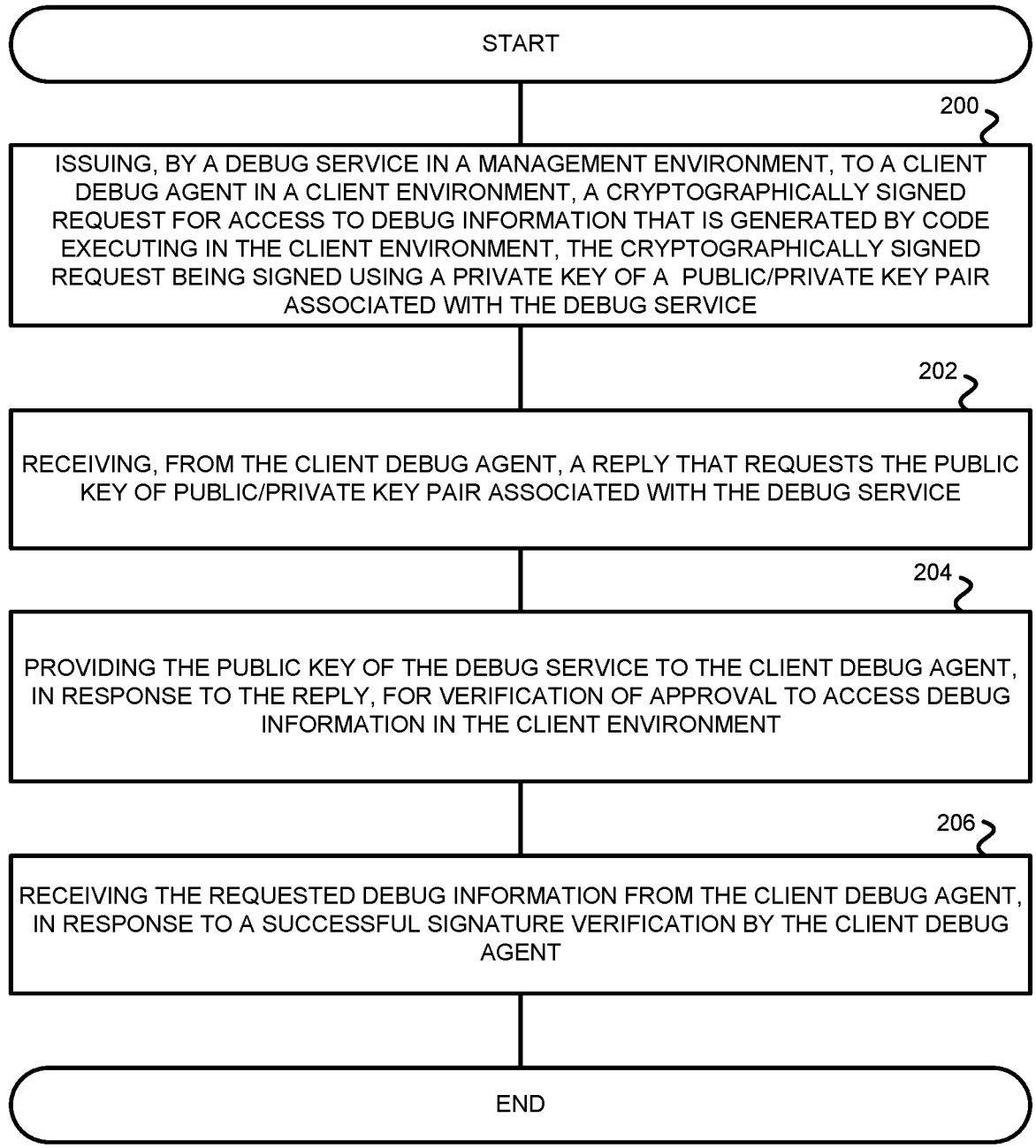
FIG. 2 is a flowchart illustrating a method for providing debug information from a computing platform according to an example set forth in the disclosure.
Figure 3:
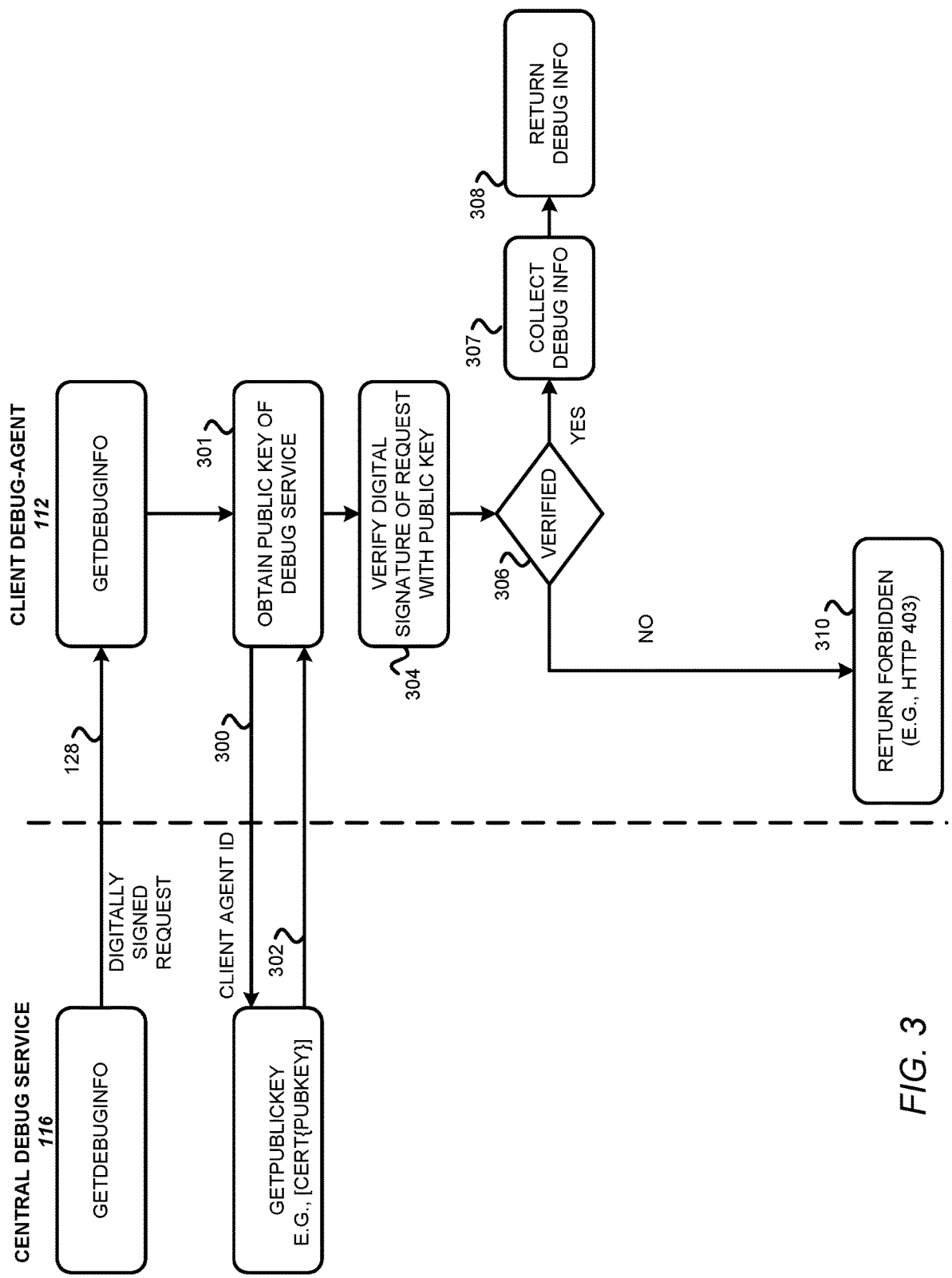
FIG. 3 is a flowchart illustrating a method for providing debug information from a computing platform according to an example set forth in the disclosure.

FIG. 2 illustrates one example of a method for providing debug information from a computing platform as carried out, for example, by the computing platform of FIG. 1. However, any suitable apparatus may be employed. FIG. 3 illustrates one example of a security authorization method employed by the platform of FIG. 1.

Referring to FIGS. 2 and 3, the method includes, as shown in block 200, issuing by the central debug service 116, to a client debug agent in a client environment, a cryptographically secure signed request 128 for access to debug information that is generated by code being debugged 102 executing in the customer environment 106. The cryptographically secure signed request 128 in some implementations, is signed using a private key of a public/private key pair 130 of the central debug service 116. For example, the client debug agents 112 and 114 verify commands or requests from the central debug service 116 before taking action in their respective environments. The central debug service 116 digitally signs the request 118 via cryptographic engine 132 with its private key (Pr) and sends the cryptographically secure signed request 128 to the corresponding environments debug agent. In this example, agent 112. The cryptographic engine may be any suitable cryptographic engine including those that carryout public key based cryptography, symmetric key based cryptography or any suitable operations.

In some implementations, the debug agents 112, 114 have no chain of trust to the central debug service 116. In some implementations, the client debug agents 112 and 114 are configured to trust a network path for the debug central service 116 public key (Kpb). For example, as shown in FIG. 3, the client debug agent 112 receives the cryptographically secure signed request 128 to get debug information from its respective client environment. In some implementations the cryptographically secure signed request includes one or more of a client environment identifier, a debug agent identifier or a an application identifier of the application to for which debug data is sought. The debug agent 112 verifies the cryptographically secure signed request by obtaining the public key of the central debug service 116, such as by the central debug service returning the PEM encoded public key (Kpb) that matches the private key of the public/private key pair 130. This is shown, for example, as the request 300 that is issued by the client debug agent in response to receiving the digitally signed request 128. The request 300 requests the public key of the public/private key pair 130 that is assigned to the central debug service 116. The public key of the central debug service will be used in the signing verification by the client debug agent 112. In some examples, the central debug service 116 provides the public key in response to the request 300. In some implementations the domain name system (DNS) is used to resolve the URL of the central infrastructure where the request is made to get the public key. The client debug agent uses the public key to verify the signed request 128 to confirm that the request 128 is coming from a trusted source and has not been tampered with.

From the perspective of the central debug service 116, the central debug service receives in block 202, from the client debug agent, a request 300 that requests the public key of the private/public key pair 130 that is associated with the central debug service 116. This is shown by block 301 where the client debug agent obtains the public key (Kpb). As shown in block 204, the method includes providing the public key as shown as reply 302 to the client debug agent 112 so that the debug agent can verify the signed request 128. In some implementations, the public key of the debugging service 116 is provided as a PEM encoded public key that is obtained through a suitable database or provided by the central debug service 116. The public key is provided for verification of approval to access debug information in the client environment. In some examples, the client environment is considered to be a secure client environment because other client environments do not have access to respective client environment assets. Only the central debug service, in some implementations, is allowed to request debug information from differing client environments. As shown by block 304, the client debug agent 112 verifies the digital signature of the digitally signed request 128 by using the public key of the central debug service which signed the request 128 using its private key (Kpr). As shown in block 306, if the digital signature is verified, the client debug agent collects the debug information as shown in block 307. The client debug agent 112 returns the requested debug information as shown in block 308 via reply 134. From the perspective of the central debug service 116, the central debug service receives the requested debug information from the client debug agent 112 in response to a successful signature verification of the signed request 128 by the client debug agent 112. This is shown in FIG. 2 as block 206. By way of example, each signed request includes the following header parameters: Expiration Timestamp: indicates when a signed request should be considered expired; X.509 Certificate: certificate chain whose corresponding private key was used to sign the request; Signed Header Names: name of all request headers included in the signing; Signature: base64 encoded client signature for the request (computed by debug-central). The following actions are performed by the client debug-agent to verify the request from debug-central: Verify the request contains all required header parameters; Verify that the request has not expired; Retrieve the public key from debug central and verify the Common Name and Issuer in the response; Verify the certificate chain using the acquired public key; and Calculate the signature in debug agent and verify that the signature matches the one provided by debug central. If any of the verification steps above fail, the request will fail with a 403 FORBIDDEN response as shown in block 310.

The public key is the central debug service's public key. The central debug service uses its corresponding private key to digitally sign all requests made to the various client debug agents. The central debug service is issued its public/private key pair 130 by a root authority that issues X.509 certificates. All client debug agents trust only the one central debug service in this example and not just any other service in the management environment 110. This provides security for debug information being requested by multiple developers through the central debug service 116. In some examples, the digitally signed request 128 is provided through a suitable "services" port in the client debug agent and each request that is received is treated the same and undergoes the verification/authorization process. Each client debug agent employs a key provider interface, in some examples, to obtain the corresponding public key of the central debug service in response to receiving a signed request.

The method also includes obtaining the public key of the central debug service from the central debug service 116 and verifying that the cryptographically secure signed request is from the central debug service. As noted above, the client debug service issues the reply 302 to provide the requested public key of the public/private key pair associated with the central debug service 116. This is done in response to receiving the cryptographically secure signed request 128 for access to debug information which results in the request 300 for the public to be issued by the client debug agent. The debug information is then provided to the central debug service as a reply 134 in response to a successful verification.

In some implementations predetermined conditions are based on a user access level for the service that a user is requesting debug information for as well as the specific environment where the service is deployed. For example, a product team may be operationally responsible for a service deployed in a customer environment, and thus would have permission to inspect debugging diagnostics for that service alone.

In some implementations, the method includes receiving a request 118 to fetch the debug information from the requesting agent 120. In some examples, the request includes a debug agent identifier such as uniquely identifying data for a particular client debug agent so that the request is provided by the central debug service to the appropriate debug agent. The method includes providing the fetched debug information received from the debug agent in response to the request to fetch the information. For example, the central debug service 116 provides the fetched debug data 138 back to the requesting agent for display for a user.

Figure 4:
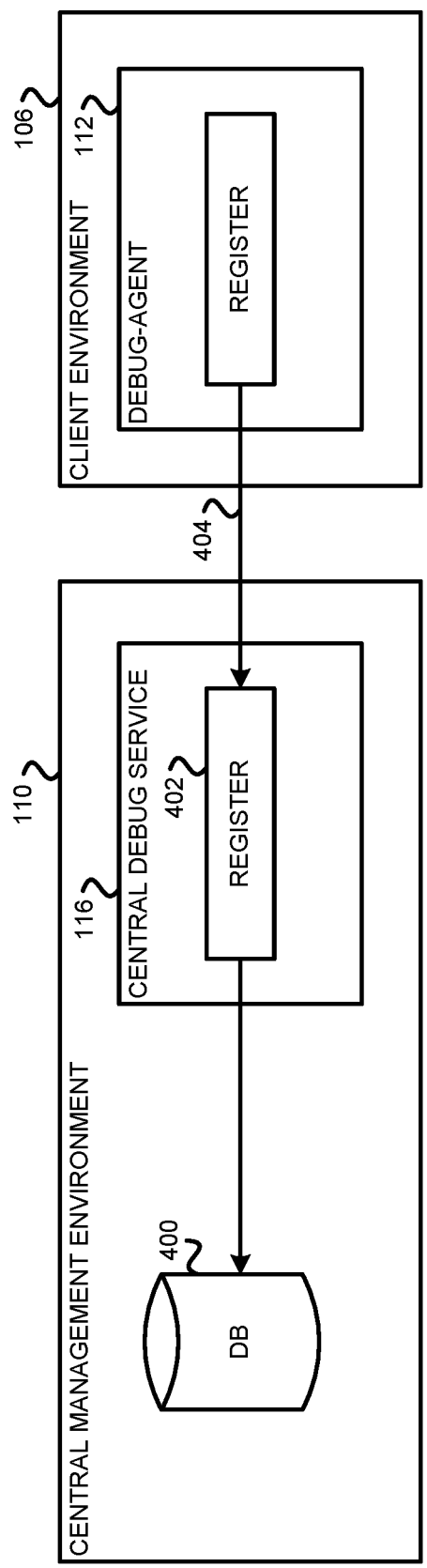
FIG. 4 is a block diagram illustrating one example of a computing platform in accordance with one example set forth in the disclosure.

FIG. 4 illustrates one example of a method for registering a debug agent to the central management environment 110 and hence the central debug service 116. For example, in some implementations, the central debug service 116 needs to know how to route to a specific client debug agent. As such, in one example, there is a mapping of an environment identifier (environmentID) to an agent URL. For example, the central debug service 116 maintains a database 400 that contains a mapping of the multiple client debug agents to their particular client environment. In one example, the central debug service exposes a registration endpoint to a client agent to use to register itself for debug data collection. The central debug service stores the mapping of requesting URLs of the client debug agents to the environmentID corresponding to a particular environment. For example, debug agent 112 is mapped to the client environment corresponding to client environment 106. Accordingly, in one example, a method includes providing debug agent registration by mapping a plurality of client debug agent identifiers to corresponding environment identifiers which in this example, is shown by the registration operation 402 carried out by the central debug service 116. When the central debug service 116 receives a request 118 for debug information from a requesting agent, the request includes data representing a destination client debug agent via an environmentID. The central debug service 116 issues the signed request 128 for access to debug information by checking the mapping of the client debug agent identifiers corresponding to the client environment identified by the requesting agent request 118. In other implementations, instead of employing a client environment identifier, the data representing the destination client debug agent is the debug agent identifier. It will be recognized that any other suitable routing or secure routing mechanism may also be employed.

As shown in FIG. 4, for example, the debug agent 112 sends a registration request 404 to the client debug service wherein the registration request 404 includes a client environmentID associated with the client environment 106 and if desired, a debug agent identifier. The debug agent cryptographically signs the request it sends when registering with the debug central service. When the central debug service is verifying the agents request it ensures that it was signed with a certificate issued to the environment the debug agent is reporting to be from. For example if the agent registers with an environmentID "test-environment-1" (effectively saying send all the requests for "test-environment-1 to this debug agent"), the central debug service makes sure that the request was signed using a certificate issued to "test-environment-1". This prevents agents spoofing one another. The central debug service maps the client environment 106 to the particular debug agent 112 and stores the mapping in database 400.

Figure 5:
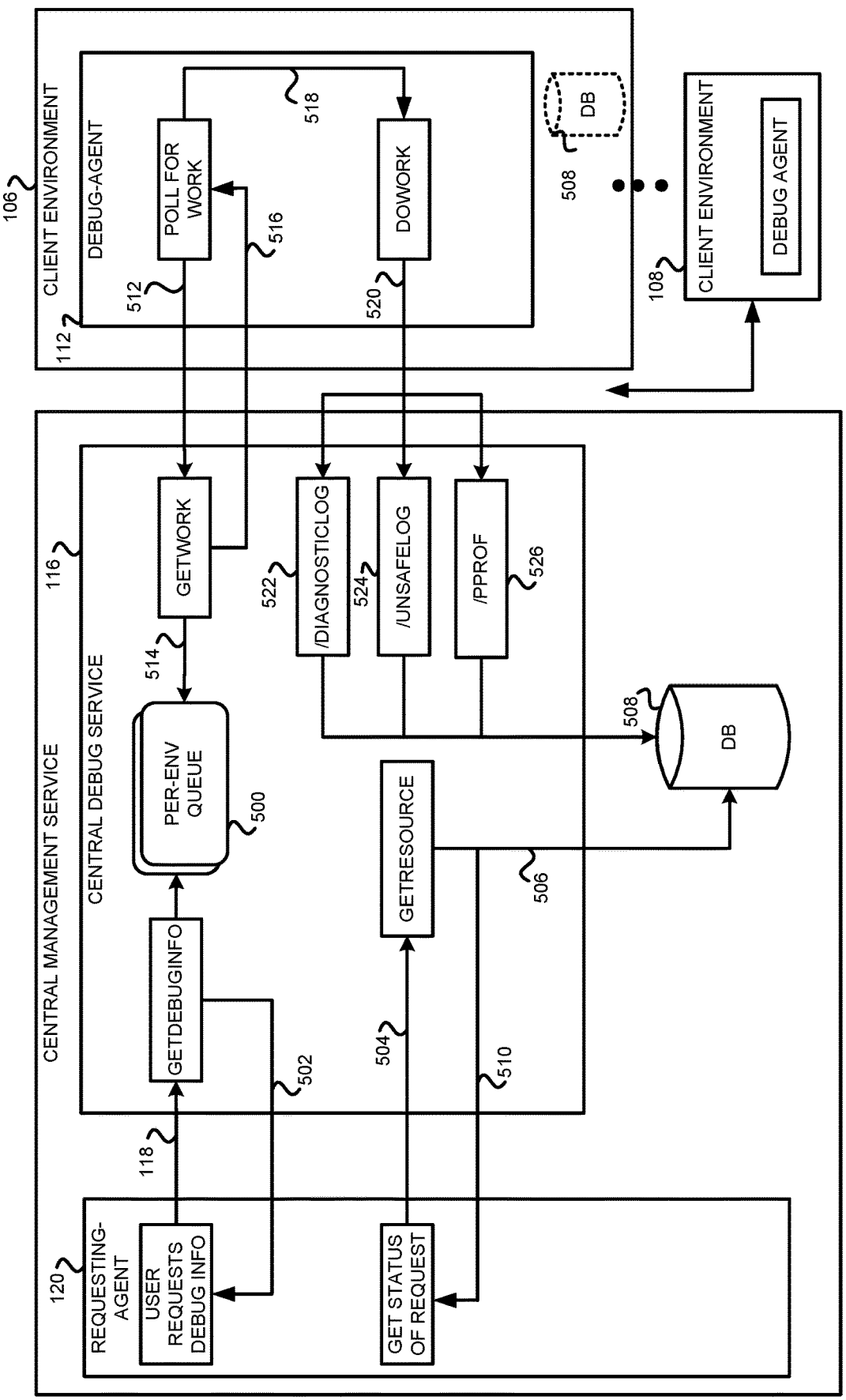
FIG. 5 is a block diagram illustrating one example of a computing platform in accordance with one example set forth in the disclosure.

FIG. 5 illustrates a pull-based model and illustrates in one example that the requesting agent issues the request to get debug information to the central debug service 116. The central debug service receives the request and generates a new "resource ID" and associates the requested "task" and enqueues the resource ID and task into a per-environment queue shown as 500 where each environment 106 and 108 have their own associated debugging job queue. As shown by arrow 502, the central debug service responds with an "accepted" response 502 such as an HTTP 202 response to the request 118. The response 502 contains the unique resource ID and "retry after" interval in which the requesting agent 120 should check for the status of the resource.

To pull the debugging information, the requesting agent 120 makes a status request 504 to the central debug service to get the resource, namely the debug information that has been provided by the debug agent, using the provided resource ID and reply 502 after the "retry after" time has elapsed. As shown by communication 506, the method includes the central debug service checking a database 508 that stores the debug information that has been received from each of the client debug agents based on the resource ID. If the resource ID exists and has not expired, then the debug data is provided to the requesting agent 120 as shown by communication 510. If the resource time has expired, then the request will be canceled because no debug data has been returned from the appropriate client debug agent within the resource expiration.

As shown by communication 512, the debug agent 112 polls the debug central service for any available work or jobs through a work request 514. The central debug service checks the respective environment queue corresponding to the client environment that the requesting debug agent is in, such as by an environmentID placed in a request 512 or the debug agent ID placed in the request 512 and either returns a set of tasks for the requesting debug agent to perform or an empty set will be returned as shown by communication 516. As shown by communication 518, the debug agent performs the retrieved tasks and for each discrete task, work is returned and placed in a log as illustrated by communication 520. In this example, there is a diagnostic log 522 and/or a pprof log 526. In one example, the diagnostic log stores diagnostic debug data corresponding to code that is being run in the client environment. The pprof log 526 in some examples includes runtime profiling data (i.e., data from a running process such as a CPU or heap profiles).

For each discrete task, the central debug service is used to return any work that was performed. The central debug service receives the request for work payloads with the resource ID and stores those in the database 508 for later retrieval. As such, the client debug agent 120 in one example, stores the diagnostic log that includes the debug information in the client environment 106 and in particular, the database 508 which is accessible by the central debug service 116. In some implementations the database 508 is in the client environment and accessible by the central debug service. For example, the diagnostic log files are stored in environment specific blob storage (such as Amazon S3), and the client debug agent retrieves and send the file back without inspecting it. The method includes providing the debug information to the requesting agent in one example by periodically retrieving the debug information from the diagnostic log. In some implementations, the client debug agent polls for debug information tasks issued by the central debug service. The client debug agent returns the generated debug information in response to the issued debug information task.

The management environment generates a web user interface in some examples using the requesting agent 120, that communicates with the central debug service 116. The web user interface is configured to provide selectable data that represents selectable debug tasks from a particular client environment. This allows for real time pulling of selected debug data.

The above methods are performed by one or more processors executing code stored in memory wherein the code is configured to provide the requesting agent 120, central debug service 116 within the management environment 110. The client environments 106, 108 are respective environments that are set up using executable code that is executed by one or more processors. The client debug agents are also code executing on one or more processors within the computing platform.

Figure 6:
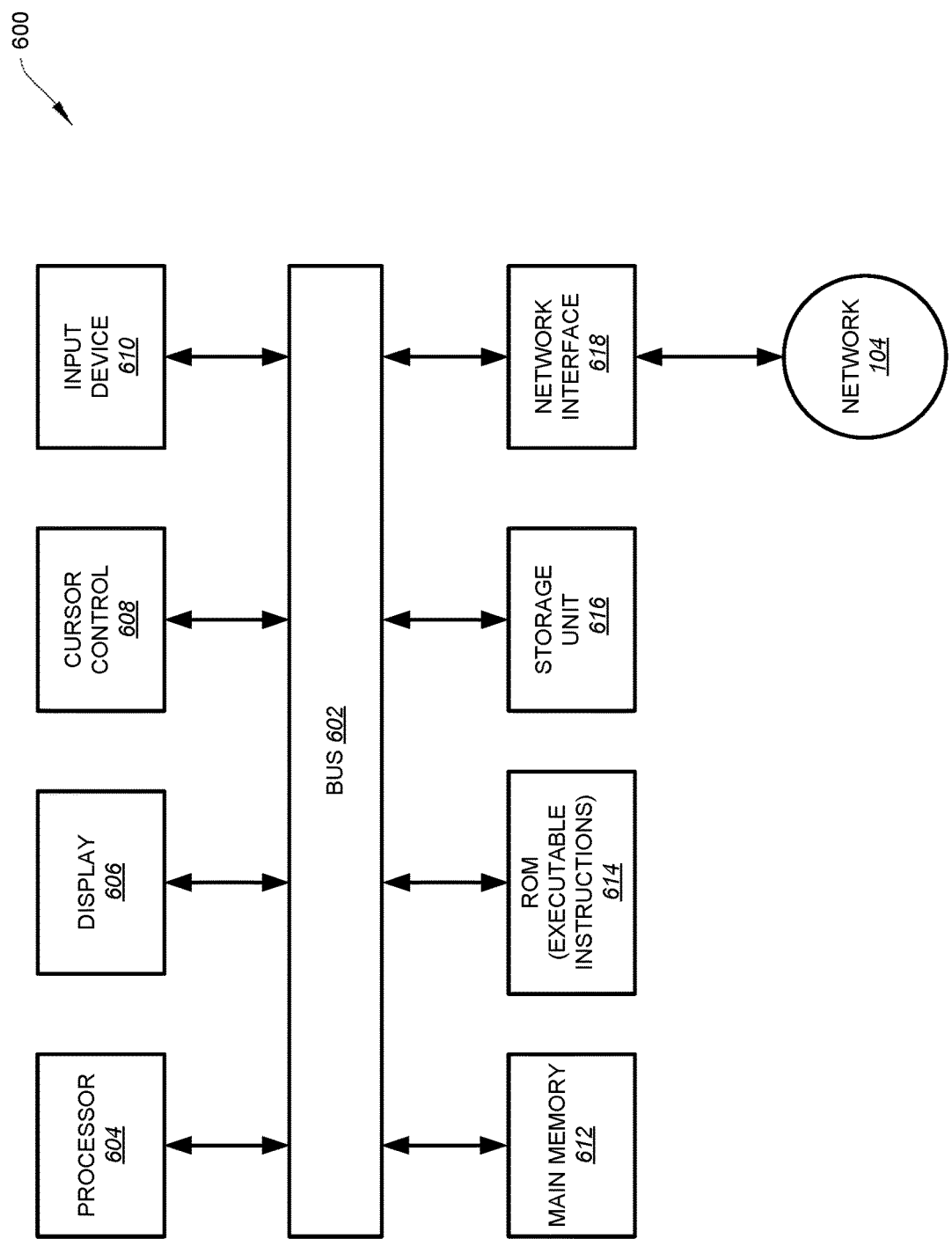
FIG. 6 is a block diagram illustrating one example of an apparatus employed in the computing platform in accordance with one example set forth in the disclosure.

FIG. 6 is a simplified diagram showing a computing system for implementing the system for providing debug operation in a computing platform according to one embodiment of the present disclosure. This diagram is merely an example, which should not unduly limit the scope of the claims. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 200 and/or the method 300 are performed by the computing system 600. In some examples, the bus 602 is coupled to the processor 604, the display 606, the cursor control component 607, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

According to some embodiments, a method for providing debug information from a computing platform, such as client computing platform that is on-premise at the client facility or a cloud computing environment, includes issuing, by a central debug service in a management environment, to a client debug agent in a client environment, a cryptographically secure signed request for access to debug information that is generated by code executing in the client environment, the cryptographically secure signed request being signed using a private key of a public/private key pair associated with the central debug service, receiving, from the client debug agent, a reply that requests the public key of public/private key pair associated with the central debug service, providing the public key of the central debug service to the client debug agent, in response to the reply, for verification of approval to access debug information in the client environment, and receiving the requested debug information from the client debug agent, in response to a successful signature verification by the client debug agent, wherein the method is carried out by one or more processors. For example, the system is implemented according to at least FIG. 1, FIG. 2, FIG. 3, FIG. 4, FIG. 5 and/or FIG. 6.

In some examples, the method includes providing debug agent registration by mapping a plurality of client debug agent identifiers to corresponding environment identifiers, receiving a request for debug information, from a requesting agent, that comprises data representing a destination client debug agent, and wherein issuing the signed request for access to debug information comprises checking the mapping of the plurality of client debug agent identifiers for the data representing the destination client debug agent. For example, the system is implemented according to at least FIG. 1, FIG. 2, FIG. 3, FIG. 4, FIG. 5 and/or FIG. 6.

In certain examples, the method includes issuing the reply that requests the public key of public/private key pair associated with the central debug service, in response to receiving the cryptographically secure signed request for access to debug information, in response to obtaining the public key of the central debug service from the central debug service, verifying that the cryptographically secure signed request is from the central debug service, and providing the debug information to the central debug service in response to a successful verification. For example, the system is implemented according to at least FIG. 1, FIG. 2, FIG. 3, FIG. 4, FIG. 5 and/or FIG. 6.

In some examples, the method includes providing one or more predetermined conditions to the client debug agent that causes the client debug agent to send debug information back to the central debug service if the one or more predetermined conditions are satisfied. For example, the system is implemented according to at least FIG. 1, FIG. 2, FIG. 3, FIG. 4, FIG. 5 and/or FIG. 6.

In certain examples, the method includes receiving a request to fetch the debug information from a requesting agent in a central management environment, wherein the request includes a debug agent identifier and providing the fetched debug information received from the debug agent in response to the request to fetch the debug information. For example, the system is implemented according to at least FIG. 1, FIG. 2, FIG. 3, FIG. 4, FIG. 5 and/or FIG. 6.

In some examples, receiving the requested debug information from the client debug agent includes the client debug agent storing a diagnostic log that includes the debug information, and providing the debug information to a requesting agent via the central debug service by periodically retrieving the debug information from the diagnostic log. For example, the diagnostic log files are stored in environment specific blob storage (such as Amazon S3), and the client debug agent retrieves and sends the file back without inspecting it. The active diagnostics (e.g., CPU/memory profiling information) is collected on demand by the client debug agent from other processes in the client environment and sent back to the central debug service. Also for example, the system is implemented according to at least FIG. 1, FIG. 2, FIG. 3, FIG. 4, FIG. 5 and/or FIG. 6.

In certain examples, the method includes polling, by the client debug agent, for debug information tasks issued by the central debug service, and returning generated debug information, by the client debug agent, in response to an issued debug information task. For example, the system is implemented according to at least FIG. 1, FIG. 2, FIG. 3, FIG. 4, FIG. 5 and/or FIG. 6.

In some examples, the method includes generating a web user interface that communicates with the central debug service, the web user interface configured to provide selectable data that represents selectable debug tasks from the client environment. For example, the system is implemented according to at least FIG. 1, FIG. 2, FIG. 3, FIG. 4, FIG. 5 and/or FIG. 6.

In certain embodiments, a method for providing debug information includes receiving a cryptographically secure signed request for access to debug information, from a central debug service, the cryptographically secure signed request being signed using a private key of a public/private key pair associated with the central debug service, issuing a request in response to the cryptographically secure signed request for access to debug information, that requests the public key of public/private key pair associated with the central debug service, in response to obtaining the public key of the central debug service from the central debug service, verifying that the cryptographically secure signed request is from the central debug service, and providing the debug information to the central debug service in response to a successful verification. For example, the system is implemented according to at least FIG. 1, FIG. 2, FIG. 3, FIG. 4, FIG. 5 and/or FIG. 6.

In some examples, the method includes receiving event criteria information from the central debug service, and sending debug information back to the central debug service on an as needed event driven basis based on the event criteria information. For example, the system is implemented according to at least FIG. 1, FIG. 2, FIG. 3, FIG. 4, FIG. 5 and/or FIG. 6.

In certain examples, the method includes polling for debug information tasks issued by the central debug service, and returning generated debug information to the central debug service in response to an issued debug information task. For example, the system is implemented according to at least FIG. 1, FIG. 2, FIG. 3, FIG. 4, FIG. 5 and/or FIG. 6.

In some embodiments, an apparatus includes one or more processors operative to execute stored instructions, and non-transitory memory, in operative communication with the one or more processors, comprising stored executable instructions that when executed by the one or more processors, causes the one or more processors to issue, by a central debug service in a management environment, to a client debug agent in a client environment, a cryptographically secure signed request for access to debug information that is generated by code executing in the client environment, the cryptographically secure signed request being signed using a private key of a public/private key pair associated with the central debug service, receive, from the client debug agent, a reply that requests the public key of public/private key pair associated with the central debug service, provide the public key of the central debug service to the client debug agent, in response to the reply, for verification of approval to access debug information in the client environment, and receive the requested debug information from the client debug agent, in response to a successful signature verification by the client debug agent. For example, the system is implemented according to at least FIG. 1, FIG. 2, FIG. 3, FIG. 4, FIG. 5 and/or FIG. 6.

In certain examples, the stored executable instructions that when executed by the one or more processors, causes the one or more processors to provide debug agent registration by mapping a plurality of client debug agent identifiers to corresponding environment identifiers, receive a request for debug information, from a requesting agent, that comprises data representing a destination client debug agent, and wherein issuing the signed request for access to debug information comprises checking the mapping of the plurality of client debug agent identifiers for the data representing the destination client debug agent. For example, the system is implemented according to at least FIG. 1, FIG. 2, FIG. 3, FIG. 4, FIG. 5 and/or FIG. 6.

In some examples, the stored executable instructions that when executed by the one or more processors, causes the one or more processors to issue the reply that requests the public key of public/private key pair associated with the central debug service, in response to receiving the cryptographically secure signed request for access to debug information, in response to obtaining the public key of the central debug service from the central debug service, verifying that the cryptographically secure signed request is from the central debug service, and provide the debug information to the central debug service in response to a successful verification. For example, the system is implemented according to at least FIG. 1, FIG. 2, FIG. 3, FIG. 4, FIG. 5 and/or FIG. 6.

In certain examples, the stored executable instructions that when executed by the one or more processors, causes the one or more processors to provide one or more predetermined conditions to the client debug agent that causes the client debug agent to send debug information back to the central debug service if the one or more predetermined conditions are satisfied. For example, the system is implemented according to at least FIG. 1, FIG. 2, FIG. 3, FIG. 4, FIG. 5 and/or FIG. 6.

In some examples, the stored executable instructions that when executed by the one or more processors, causes the one or more processors to receive a request to fetch the debug information from a requesting agent in a central management environment, wherein the request includes a debug agent identifier, and provide the fetched debug information received from the debug agent in response to the request to fetch the debug information. For example, the system is implemented according to at least FIG. 1, FIG. 2, FIG. 3, FIG. 4, FIG. 5 and/or FIG. 6.

In certain examples, the stored executable instructions that when executed by the one or more processors, causes the one or more processors to store a diagnostic log comprising the debug information in the management environment that is accessible by the client debug agent, and provide the debug information to a requesting agent by periodically retrieving the debug information from the diagnostic log. For example, the system is implemented according to at least FIG. 1, FIG. 2, FIG. 3, FIG. 4, FIG. 5 and/or FIG. 6.

In some examples, the stored executable instructions that when executed by the one or more processors, causes the one or more processors to generate a web user interface that communicates with the central debug service, the web user interface configured to provide selectable data that represents selectable debug tasks from the client environment. For example, the system is implemented according to at least FIG. 1, FIG. 2, FIG. 3, FIG. 4, FIG. 5 and/or FIG. 6.

In certain examples, the apparatus including a plurality of processors wherein at least one of the plurality of processors is configured to receive a cryptographically secure signed request for access to debug information, from a central debug service, the cryptographically secure signed request being signed using a private key of a public/private key pair associated with the central debug service, issue a request in response to the cryptographically secure signed request for access to debug information, that requests the public key of public/private key pair associated with the central debug service, in response to obtaining the public key of the central debug service from the central debug service, verifying that the cryptographically secure signed request is from the central debug service, and provide the debug information to the central debug service in response to a successful verification. For example, the system is implemented according to at least FIG. 1, FIG. 2, FIG. 3, FIG. 4, FIG. 5 and/or FIG. 6.

In some examples, wherein the at least one of the plurality of processors is further configured to receive event criteria information from the central debug service, and send debug information back to the central debug service on an as needed event driven basis based on the event criteria information. For example, the system is implemented according to at least FIG. 1, FIG. 2, FIG. 3, FIG. 4, FIG. 5 and/or FIG. 6.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided in connection with many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module includes one or more stored units of code and/or a processor that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system (e.g., the cloud computing platform or client computing system that interfaces with the debugging system) can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing debug information comprising:
issuing, by a central debug service in a management environment, to a client debug agent in a client environment, a cryptographically secure signed request for access to debug information that is generated by code executing in the client environment, the cryptographically secure signed request being signed using a private key of a public/private key pair associated with the central debug service;
receiving, from the client debug agent, a request that requests the public key of public/private key pair associated with the central debug service;
providing the public key of the central debug service to the client debug agent, in response to the request, for verification of approval to access debug information in the client environment; and
receiving the requested debug information from the client debug agent, in response to a successful signature verification by the client debug agent;
wherein the method is carried out by one or more processors.

2. The method of claim 1 comprising:
providing debug agent registration by mapping a plurality of client debug agent identifiers to corresponding environment identifiers;
receiving a request for debug information, from a requesting agent, that comprises data representing a destination client debug agent; and
wherein issuing the signed request for access to debug information comprises checking the mapping of the plurality of client debug agent identifiers for the data representing the destination client debug agent.

3. The method of claim 1 comprising:
issuing the reply that requests the public key of public/private key pair associated with the central debug service, in response to receiving the cryptographically secure signed request for access to debug information;
in response to obtaining the public key of the central debug service from the central debug service, verifying that the cryptographically secure signed request is from the central debug service; and
providing the debug information to the central debug service in response to a successful verification.

4. The method of claim 1 comprising:
providing one or more predetermined conditions to the client debug agent that causes the client debug agent to send debug information back to the central debug service if the one or more predetermined conditions are satisfied.

5. The method of claim 1 comprising:
receiving a request to fetch the debug information from a requesting agent in a central management environment, wherein the request includes a debug agent identifier; and
providing the fetched debug information received from the debug agent in response to the request to fetch the debug information.

6. The method of claim 1 wherein receiving the requested debug information from the client debug agent comprises:
storing a diagnostic log comprising the debug information by the client debug agent; and
providing the debug information to a requesting agent by periodically retrieving the debug information from the diagnostic log.

7. The method of claim 6 comprising:
polling, by the client debug agent, for debug information tasks issued by the central debug service; and
returning generated debug information, by the client debug agent, in response to an issued debug information task.

8. The method of claim 1 comprising generating a web user interface that communicates with the central debug service, the web user interface configured to provide selectable data that represents selectable debug tasks from the client environment.

9. A method for providing debug information comprising:
receiving a cryptographically secure signed request for access to debug information, from a central debug service, the cryptographically secure signed request being signed using a private key of a public/private key pair associated with the central debug service;
issuing a request in response to the cryptographically secure signed request for access to debug information, that requests the public key of public/private key pair associated with the central debug service;
in response to obtaining the public key of the central debug service from the central debug service, verifying that the cryptographically secure signed request is from the central debug service; and
providing the debug information to the central debug service in response to a successful verification.

10. The method of claim 9 comprising:
receiving event criteria information from the central debug service; and
sending debug information back to the central debug service on an as needed event driven basis based on the event criteria information.

11. The method of claim 10 comprising:
polling for debug information tasks issued by the central debug service; and
returning generated debug information to the central debug service in response to an issued debug information task.

12. An apparatus comprising:
one or more processors operative to execute stored instructions; and
non transitory memory, in operative communication with the one or more processors, comprising stored executable instructions that when executed by the one or more processors, causes the one or more processors to:
issue, by a central debug service in a management environment, to a client debug agent in a client environment, a cryptographically secure signed request for access to debug information that is generated by code executing in the client environment, the cryptographically secure signed request being signed using a private key of a public/private key pair associated with the central debug service;
receive, from the client debug agent, a request that requests the public key of public/private key pair associated with the central debug service;
provide the public key of the central debug service to the client debug agent, in response to the request, for verification of approval to access debug information in the client environment; and
receive the requested debug information from the client debug agent, in response to a successful signature verification by the client debug agent.

13. The apparatus of claim 12 wherein the stored executable instructions that when executed by the one or more processors, causes the one or more processors to:
- provide debug agent registration by mapping a plurality of client debug agent identifiers to corresponding environment identifiers;
- receive a request for debug information, from a requesting agent, that comprises data representing a destination client debug agent; and
- wherein issuing the signed request for access to debug information comprises checking the mapping of the plurality of client debug agent identifiers for the data representing the destination client debug agent.

14. The apparatus of claim 12 wherein the stored executable instructions that when executed by the one or more processors, causes the one or more processors to:
- issue the reply that requests the public key of public/private key pair associated with the central debug service, in response to receiving the cryptographically secure signed request for access to debug information;
- in response to obtaining the public key of the central debug service from the central debug service, verifying that the cryptographically secure signed request is from the central debug service; and
- provide the debug information to the central debug service in response to a successful verification.

15. The apparatus of claim 12 wherein the stored executable instructions that when executed by the one or more processors, causes the one or more processors to:
- provide one or more predetermined conditions to the client debug agent that causes the client debug agent to send debug information back to the central debug service if the one or more predetermined conditions are satisfied.

16. The apparatus of claim 12 wherein the stored executable instructions that when executed by the one or more processors, causes the one or more processors to:
- receive a request to fetch the debug information from a requesting agent in a central management environment, wherein the request includes a debug agent identifier; and
- provide the fetched debug information received from the debug agent in response to the request to fetch the debug information.

17. The apparatus of claim 12 wherein the stored executable instructions that when executed by the one or more processors, causes the one or more processors to:
- store a diagnostic log comprising the debug information by the client debug agent; and
- provide the debug information to a requesting agent by periodically retrieving the debug information from the diagnostic log.

18. The apparatus of claim 12 wherein the stored executable instructions that when executed by the one or more processors, causes the one or more processors to generate a web user interface that communicates with the central debug service, the web user interface configured to provide selectable data that represents selectable debug tasks from the client environment.

19. The apparatus of claim 12 comprising a plurality of processors wherein at least one of the plurality of processors is configured to:
- receive a cryptographically secure signed request for access to debug information, from a central debug service, the cryptographically secure signed request being signed using a private key of a public/private key pair associated with the central debug service;
- issue a request in response to the cryptographically secure signed request for access to debug information, that requests the public key of public/private key pair associated with the central debug service;
- in response to obtaining the public key of the central debug service from the central debug service, verifying that the cryptographically secure signed request is from the central debug service; and
- provide the debug information to the central debug service in response to a successful verification.

20. The apparatus of claim 19 wherein the at least one of the plurality of processors is further configured to:
- receive event criteria information from the central debug service; and
- send debug information back to the central debug service on an as needed event driven basis based on the event criteria information.

* * * * *